(12) United States Patent
Zander et al.

(10) Patent No.: US 11,199,039 B2
(45) Date of Patent: Dec. 14, 2021

(54) DRIVE DEVICE FOR A VEHICLE FLAP

(71) Applicant: Edscha Engineering GmbH, Remscheid (DE)

(72) Inventors: Marc Zander, Ratingen (DE); Jochen Bals, Dortmund (DE)

(73) Assignee: EDSCHA ENGINEERING GMBH, Remscheid (DE)

( * ) Notice: Subject to any disclaimer, the term of this patent is extended or adjusted under 35 U.S.C. 154(b) by 0 days.

(21) Appl. No.: 16/640,591

(22) PCT Filed: Aug. 15, 2018

(86) PCT No.: PCT/DE2018/100714
§ 371 (c)(1),
(2) Date: Feb. 20, 2020

(87) PCT Pub. No.: WO2019/037817
PCT Pub. Date: Feb. 28, 2019

(65) Prior Publication Data
US 2020/0173220 A1 Jun. 4, 2020

(30) Foreign Application Priority Data
Aug. 22, 2017 (DE) .................. 20 2017 105 031.9

(51) Int. Cl.
*H02P 3/18* (2006.01)
*E05F 15/603* (2015.01)
*H02H 7/085* (2006.01)

(52) U.S. Cl.
CPC ......... *E05F 15/603* (2015.01); *H02H 7/0851* (2013.01); *H02P 3/18* (2013.01);
(Continued)

(58) Field of Classification Search
CPC ........... E05F 5/003; E05F 15/603; H02P 3/18; H02P 6/24; H02H 7/0851
See application file for complete search history.

(56) References Cited

U.S. PATENT DOCUMENTS 6,175,204 B1 * 1/2001 Calamatas ................ H02P 7/04
318/375
6,198,241 B1 * 3/2001 Calamatas ........... H02H 7/0838
318/434
(Continued)

FOREIGN PATENT DOCUMENTS

DE 102009042456 B4 6/2013
DE 102015112807 A1 2/2017
(Continued)

OTHER PUBLICATIONS

Corresponding PCT International Search Report of PCT/DE2018/100714.

*Primary Examiner* — Thai T Dinh
(74) *Attorney, Agent, or Firm* — Davidson, Davidson & Kappel, LLC

(57) ABSTRACT

A drive device for a vehicle flap includes an electric motor (2) for driving the vehicle flap, and a supply switching circuit (3). The supply switching circuit (3) includes a first voltage source (9) for supplying current to the electric motor (2), a first electrical supply line (4) and a second electrical supply line (5). The first voltage source (9) is arranged between the first electrical supply line (4) and the second electrical supply line (5). The drive device also includes a control switching circuit (12) including a second voltage source (14) and a switching control device (13). The drive device includes a switching element (10) and a diode (11) connected between the first electrical supply line (4) and the second electrical supply line (5).

16 Claims, 3 Drawing Sheets

(52) U.S. Cl.
CPC ..... *E05Y 2400/40* (2013.01); *E05Y 2400/445* (2013.01); *E05Y 2900/531* (2013.01)

(56) References Cited

U.S. PATENT DOCUMENTS

| | | | | |
|---|---|---|---|---|
| 6,727,674 | B2* | 4/2004 | Schmidt | H02M 7/53873 |
| | | | | 318/599 |
| 6,978,609 | B2* | 12/2005 | Busch | E05F 3/223 |
| | | | | 60/460 |
| 7,075,257 | B2* | 7/2006 | Carrier | H02P 3/12 |
| | | | | 318/375 |
| 7,265,992 | B2* | 9/2007 | Forinash | H03K 19/177 |
| | | | | 361/735 |
| 7,665,298 | B2* | 2/2010 | Di Saverio | E05F 15/53 |
| | | | | 60/328 |
| 8,508,170 | B2 | 8/2013 | Bochen | |
| 8,704,468 | B2* | 4/2014 | Rottmerhusen | H02P 3/22 |
| | | | | 318/381 |
| 2017/0009510 | A1* | 1/2017 | Fujimoto | B60J 5/10 |
| 2017/0191298 | A1* | 7/2017 | Mair | E05F 15/659 |

FOREIGN PATENT DOCUMENTS

| | | |
|---|---|---|
| EP | 1783309 A2 | 5/2007 |
| WO | WO2015177295 A1 | 11/2015 |

\* cited by examiner

DRIVE DEVICE FOR A VEHICLE FLAP

The invention relates to a drive device for a vehicle flap. The invention furthermore relates to a vehicle comprising a drive device for a vehicle flap.

BACKGROUND

In practice, drive devices for vehicle flaps are known which allow for automatic opening or closing of the vehicle flap. In this case, drive devices of this kind are often switched from a standby mode into an operating mode by means of remote-control or by means of optical sensors. In this case, drive devices of this kind comprise a motor which is usually an electric motor. The electric motor is expediently supplied with energy from the internal power supply of the vehicle and is coupled to a transmission that is connected to one or more mechanical adjustment elements. The drive device is usually designed as a linear drive, in particular as a spindle drive. In this case, linear drives are advantageous in that they are very simple in design and are easy to control. The motor thereby drives one of the spindle nut and spindle rod in rotation, such that two mutually opposing housing parts of the drive device, which are each connected to the spindle nut or spindle rod, move relative to one another.

In addition to the function of the vehicle flap being intended to be closed and opened automatically, drive devices of this kind often also fulfil the function of a door fixing means which is intended to brake or fix the door. Braking of the driven vehicle flap is usually achieved by using a permanent brake which acts on the drive train of the drive device. It is known from practice that the electric motor can be designed so as to be self-locking, such that the electric motor itself acts on a pivot movement of the vehicle flap as a mechanical brake. Nonetheless, in certain situations excessive forces arise on the vehicle flap, in particular in the closing direction, where the conventional measures, as described above, are often not sufficient for providing a sufficiently high retaining force, in particular in the case of a voltage drop.

DE 10 2009 042 456 B4 discloses a drive device for a pivotable vehicle flap, the drive device being designed as a linear drive. The drive device comprises an electric motor which is operated or controlled by a controller. The controller comprises a control and safety circuit which is arranged on an electronic circuit board which is in turn fastened in a housing tube of the drive device. The drive device further comprises a first electrical lead and a second electrical lead for the electric motor, wherein a plurality of diodes and triacs are arranged in parallel with the electric motor between the first electrical lead and the second electrical lead. A disadvantage of the drive device shown is that the control and safety circuit comprises a very large number of individual components, with the result that the drive device is accordingly high-maintenance and susceptible to faults. Furthermore, the costs when producing the drive device are correspondingly high.

DE 10 2015 112 807 A1 discloses a drive device comprising a DC motor which is supplied with power via a first electrical lead and a second electrical lead. A transistor and a plurality of resistors are arranged in parallel with the DC motor, between the first electrical lead and the second electrical lead. Furthermore, a varistor and a resistor are connected in parallel with the transistor, such that a brief short circuit of the motor or of the voltage source occurs when a specified voltage value between the first electrical lead and the second electrical lead is exceeded. This brings about braking of the motor. A disadvantage of the drive device shown is that, although it brings about braking in the case of overloading of the motor, it does not provide braking in the event of a failure of the power supply. Furthermore, braking is brought about in both pivot directions of the vehicle flap. This is disadvantageous, however, in particular in those situations in which the vehicle flap is pre-loaded in the closing direction by external forces, in particular its own weight force. This makes it more difficult to open the vehicle flap quickly in an emergency, and at the same time to prevent the vehicle flap from being moved back again in the closing direction.

SUMMARY

An object of the present disclosure is to provide a drive device for a pivotable vehicle flap or a vehicle which allows for reliable and safe pivoting of the vehicle flap. In particular, manual pivoting should be possible, at least in one direction, even in the case of a voltage drop in the vehicle.

A drive device for a pivotable vehicle flap is provided, comprising an electric motor for driving the vehicle flap, and a supply circuit. The supply circuit comprises a first electrical voltage source for supplying power to the electric motor, a first electrical lead and a second electrical lead, wherein the first voltage source is arranged between the first electrical lead and the second electrical lead. The drive device further comprises a control circuit, comprising a second voltage source and a switch control device. The drive device is characterized in that a switching element and a diode are connected between the first electrical lead and the second electrical lead. Advantageously, the drive device or the provision of a switching element and a diode in the supply circuit allows for reliable and save pivoting of the vehicle flap in the opening direction or closing direction, the drive device being braked or the vehicle flap being retained in the opposing pivot direction, in each case, by a short circuit of the electric motor. This can be particularly advantageous in an accident situation, when the power supply in the vehicle has dropped and the occupants wish to open the door, as easily as possible, in the opening direction.

The switching element is expediently coupled to the switch control device. Particularly preferably, the switch control device provides a control voltage for switching the switching element. This advantageously makes it possible to bring about the short circuit of the electric motor, and thus the braking thereof, depending on external states, for example the state of the voltage supply of the switching device or the voltage supply of the electric motor.

In an advantageous embodiment, the switching element and the diode are connected in series. This advantageously makes it possible to short-circuit the first electrical lead and the second electrical lead connected to the electric motor, the diode ensuring that the electric motor is braked in one direction of rotation and is largely freely rotatable in the opposing direction of rotation.

In a preferred embodiment, the diode is arranged in the forward direction, in the direction from the first electrical lead to the second electrical lead. In an alternative embodiment, the diode is arranged in the reverse direction, in the direction from the first electrical lead to the second electrical lead. Particularly preferably, the diode is arranged between the first electrical lead and the second electrical lead, such that the drive device is braked, in the closing direction, in the event of a short circuit. This advantageously ensures that, in the event of a malfunction of the power supply of the drive device, a person can open the vehicle flap without the vehicle flap moving back again in the closing direction, owing to its own weight force.

In a particularly preferred embodiment, the switch control device is designed as a relay. It is thus advantageously possible for a short circuit of the electric motor to be achieved in a particularly reliable and simple manner. In an expedient embodiment, the switching element that is coupled to the switch control device is designed as a normally closed contact. A normally closed contact is characterized in that the switching element is in a closed position when the control coil is unloaded. Thus, in the event of a power failure in the drive device, braking of the electric motor is performed in at least one direction.

In an expedient embodiment, the switching element that is coupled to the switch control device is designed as a changeover contact. This advantageously makes it possible to achieve a short circuit of the electric motor even in the event of a voltage failure, without it being necessary for the voltage in the vehicle or in the drive device to be dropping completely. In addition, it is possible to use the voltage peaks arising during a voltage drop for switching the switching element.

In an alternative development, the switching element is designed as a bipolar transistor. The base of the transistor is expediently connected to the switch control device. The switch control device advantageously provides a control voltage between the base and the collector of the transistor. It is thus advantageously possible for purposeful actuation of the transistor to be achieved by means of the switch control device. Furthermore, providing a transistor advantageously makes it possible to achieve a graduation of the brake force during manual pivoting of the vehicle flap.

In a further embodiment, the transistor is designed as an NPN transistor. Alternatively thereto, the transistor is designed as a PNP transistor. By means of a corresponding selection between the two types of transistor, depending on the embodiment of the switch control device, it is possible to use both negative and positive control voltages for switching the transistor.

In an alternative development, the switching element is designed as a unipolar transistor. The gate of the unipolar transistor is expediently coupled to the switch control device. The switch control device expediently provides a control voltage at the gate. This advantageously makes it possible for more precise braking, depending on external parameters, to be achieved by means of the switch control device. The external parameters can for example be the current opening angle of the vehicle flap or the acceleration or speed of the vehicle flap during pivoting. Furthermore, the external parameters may be optical signals such as the distance of an obstacle from the vehicle flap. It is thus advantageously possible to prevent the obstacle from colliding with the vehicle flap during opening thereof, and damage occurring. The optical signals can be detected by an optical element such as a camera and converted by the switch control device into the corresponding control voltage at the gate or the switching element.

In a particularly preferred embodiment, the control circuit comprises a logic unit. Providing a logic unit advantageously makes it possible to evaluate external parameters over a particular time period. The logic unit is expediently supplied with power by the first voltage source of the control circuit. The logic unit is expediently coupled to the switch control device. As a result, the switch control device and thus the switching element coupled to the switch control device can be controlled on the basis of external parameters. Evaluations of the external parameters can advantageously take place via evaluation electronics which can be used for the wiring of the control circuit.

The diode is particularly preferably designed as a flyback diode. Flyback diodes are generally used as protection against overvoltage, the threshold voltage at which a current flows through the diode typically being between 0.3 V and 0.7 V, depending on the semiconductor element.

In a first embodiment, the electric motor is designed as a DC motor. The electric motor is advantageously braked by self-induction in the event of a short circuit of the electrical lead. In a development, the electric motor is designed as a brushless DC motor. The DC motor is expediently designed so as to include a mechanical inverter. Particularly preferably, the DC motor comprises a permanent magnet, between the two poles of which a rotor, which comprises a coil, is arranged. In this case, a speed-dependent alternating current is generated in the rotor of the DC motor. In this case, it is particularly advantageous with respect to the drive device and the problem addressed for a short circuit of the voltage supply of the DC motor making it possible for said motor to be converted into a DC generator which, in the event of an outer mechanical movement of the rotor, generates a brake force, owing to Lenz's law, counter to the externally mechanically induced movement of the rotor. A diode being additionally connected, in parallel, in the supply circuit of the DC motor, ensures that the braking effect of the DC motor effectively occurs only in one direction of rotation.

A vehicle is also provided, comprising a vehicle flap, the vehicle flap being pivotably arranged on a vehicle body part. The vehicle further comprises a drive device, a first end of the drive device being pivotably coupled to one of the vehicle flap and vehicle body part, and a second end of said drive device being pivotably coupled to the other of the vehicle flap and vehicle body part. In this case, the vehicle is characterized in that the drive device is designed as described above.

BRIEF SUMMARY OF THE DRAWINGS

The invention will now be explained in more detail based on preferred embodiments of the invention with reference to the accompanying drawings.

DETAILED DESCRIPTION

Figure 1:
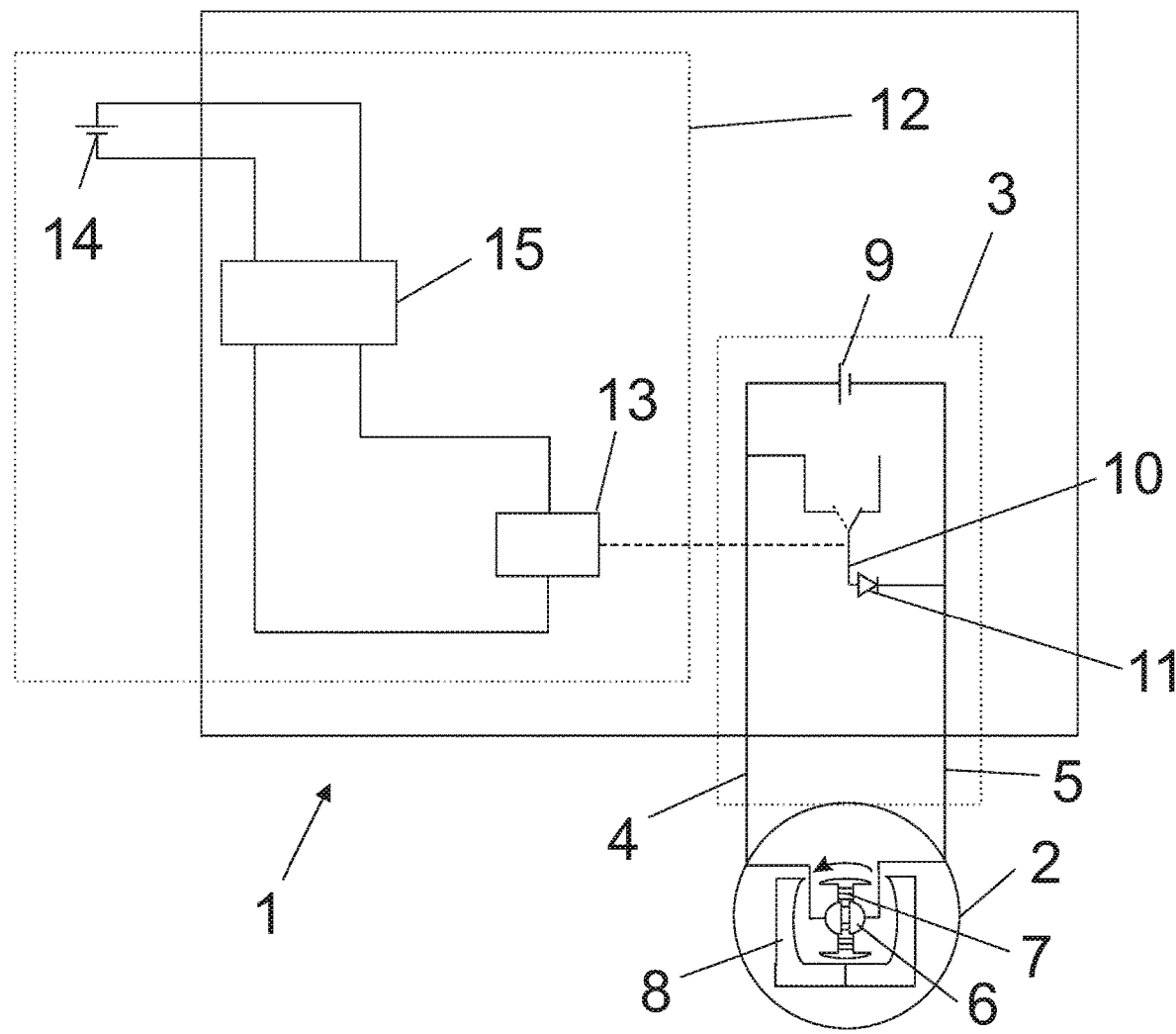
FIG. 1 schematically shows a first embodiment of a drive device.

FIG. 1 schematically shows a first embodiment of a drive device 1, the drive device 1 comprising a motor 2. The motor 2 is designed as a DC motor which is supplied with power via a supply circuit 3. In this case, the supply circuit 3 comprises a first electrical lead 4 and a second electrical lead 5 which are connected to a commutator 6 of the electric motor 2. The commutator 6, in turn, is connected to a coil 7 that is rotatably mounted.

The rotatable coil 7 is surrounded by a permanent magnet 8. In this case, the first electrical lead 4 and the second electrical lead 5 are connected to the first voltage source 9, such that the current direction in the coil 7 depends on the angle of rotation, in each case, of the coil 7 relative to the fixed commutator 6.

A switching element 10, which is designed as a normally-closed contact and a diode 11 which, in this case, is a flyback diode, are connected between the first electrical lead 4 and the second electrical lead 5, in parallel with the motor 2. The diode 11 is arranged in the forward direction, in the direction from the first electrical lead 4 to the second electrical lead 5. This makes it possible to short-circuit the motor 2 or the two electrical leads 4, 5, such that the DC motor 2 becomes a DC generator, and thus a braking effect develops, counter to a mechanical movement generated from the outside, at least in one direction of rotation.

The switching element 10 is switched from the outside, using a switching control circuit 12. In the embodiment of a drive device 1 shown in FIG. 1, the switching control circuit 12 comprises a switch control device 13 that is designed as a relay and that leaves the switching element 10, designed as a normally open contact, in an open state during normal operation of the drive device 1, and brings it into a closed position in the event of a malfunction or a voltage drop in the drive device 1. The switching control circuit 12 further comprises a second voltage source 14 and a logic unit 15, the voltage source 14 supplying both the logic unit 15 and the switch control device 13 with power. This guarantees, in particular in the event of the second voltage source 14 failing, that the switch control device 13 designed as a relay is not supplied with power and thus the switching element 10 that is coupled to the switch control device 13 is closed. Furthermore, the fact that the logic unit 15 is connected in parallel with the switch control device 13 makes it possible to regulate the power supply of the switch control device 13, even for a voltage drop of the voltage source 14, such that the switching element 10 that is coupled to the switch control device 13 is closed.

Figure 2:
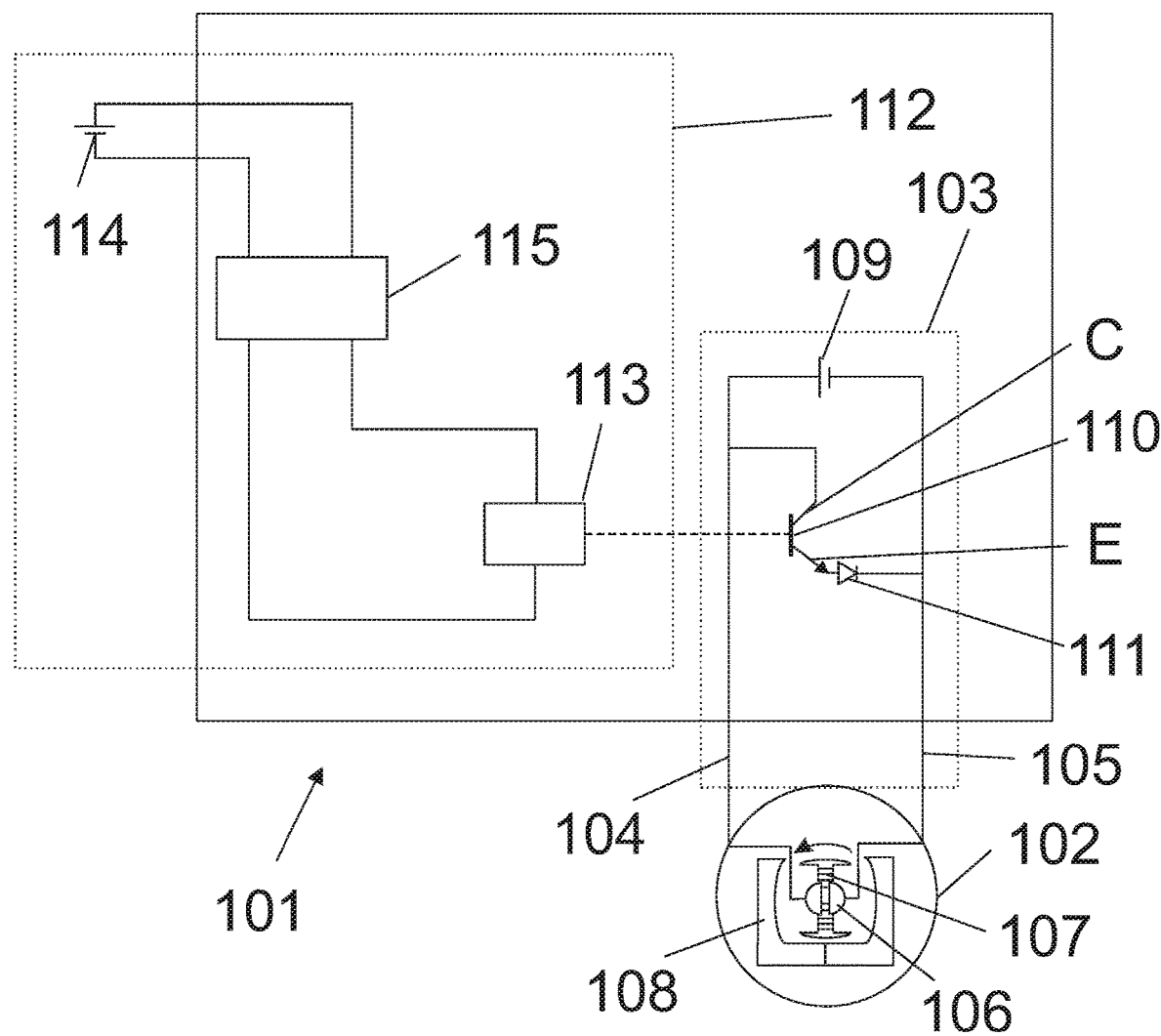
FIG. 2 schematically shows a second embodiment of a drive device.

FIG. 2 schematically shows a second embodiment of a drive device 101. The reference signs of components that are similar to or the same as those in the embodiment shown in FIG. 1 are incremented by 100. In contrast to the first embodiment shown in FIG. 1, the supply circuit 103 comprises a switching element 110 which is connected in parallel with the motor 102, between the first electrical lead 104 and the second electrical lead 105, and which is designed as a bipolar transistor. As can also be seen in the first embodiment from FIG. 1, a diode 111 is connected in series with the bipolar transistor 110. The bipolar transistor 110 is designed as an NPN transistor, the base B being connected to a switch control device 113.

The switch control device 113 is part of a switching control circuit 112, a logic unit 115 being connected in parallel with the switch control device 113. Furthermore, the switching control circuit 113 comprises a voltage supply 115 which supplies both the logic unit 115 and the switch control device 113 with power. In this case, the switch control device 113 provides a control voltage at the base B of the bipolar transistor 110, such that the electrical resistance between the first electrical lead 104 and the second electrical lead 105 can be regulated by the switch control device 113. In this case, the first supply cable 104 is connected to the collector C, and the diode 110 is connected to the emitter E of the bipolar transistor 110. This provides the possibility of short-circuiting the first supply cable 104 and the second electrical lead 105 by means of the control voltage that is provided by the switch control device 113 and is applied to the base B.

Figure 3:
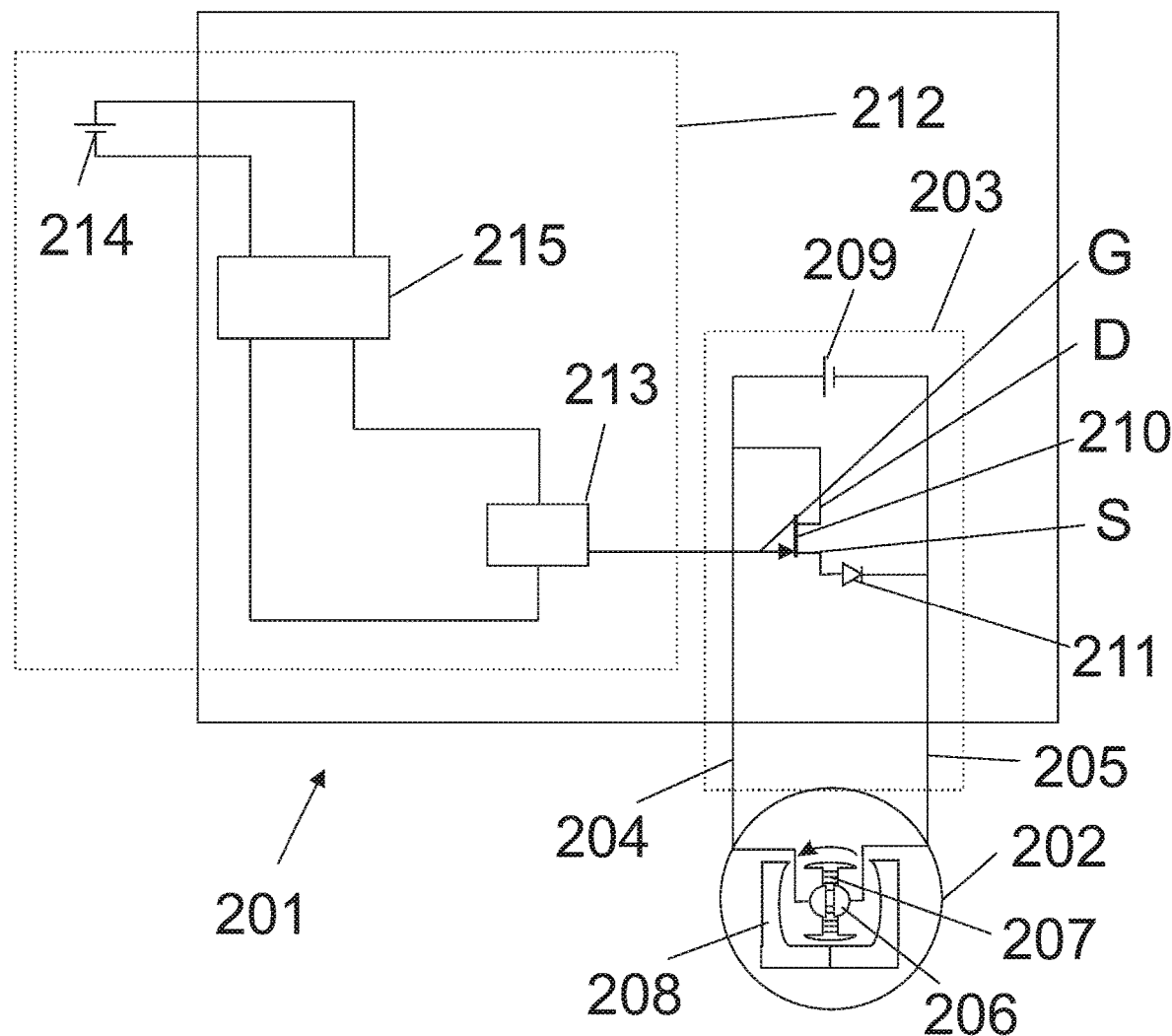
FIG. 3 schematically shows a third embodiment of a drive device.

FIG. 3 shows a third embodiment of a drive device 201. The drive device 201 is designed in a substantially similar manner to the second embodiment shown in FIG. 2, the switching element 210 designed as a transistor now being designed as a unipolar transistor or MOSFET. The gate G of the transistor 210 is coupled to the switch control device 213, the switch control device 213 providing a control voltage at the gate G and thus controlling the electrical resistance. In this case the source terminal S is connected to the diode 211, and the drain terminal D is connected to the first electrical lead 204.

In the following, the mode of operation of the drive device will be explained by way of example, with reference to the embodiment shown in FIG. 1.

FIG. 1 shows the drive device 1 during normal operation. In this case, the switching element 9 is in an open position, such that the motor 2 can be supplied with power via the supply circuit 3. In the event of a voltage drop at the voltage source 8 of the supply circuit 3 or a complete voltage loss at the voltage source 13 of the switching control circuit 11, the switching element 9 that is designed as a normally closed contact is brought into the closed position (shown in dashed lines) by means of the switch control device 12 that is designed as a relay, such that the first electrical lead 4 and the second electrical lead 5 are short-circuited by the diode 10, at least in the direction from the first electrical lead 4 to the second electrical lead 5. In this case, this state corresponds to a fail-safe mode, such as is provided in the event of a failure of the power supply in the vehicle or even damage to the drive device 1. In this case, the diode 10 that is designed as a flyback diode is connected in the forward current direction, in the direction from the first electrical lead 4 to the second electrical lead 5, such that the drive device 1 or the motor 2 is braked or fixed in the closing direction of the vehicle flap, and is at the same time movable manually in the opening direction of the vehicle flap, without significant resistance. As a result, the user is able for example to open a vehicle flap that is designed as a side door, if the vehicle is on a mountain and the side door should be prevented from falling back into the lock again, due to the high gravitational moment.

The invention has been explained above with reference to a plurality of embodiments in which one switching element and one diode are connected in parallel with the motor in each case. Of course, it is also possible that a plurality of pairs of switching elements and diodes connected in parallel may be provided. In this case, the functional redundancy ensures that a short circuit of the motor always occurs safely and reliably, in the case of a voltage drop, even in the event of a switching element or a diode being damaged.

The invention claimed is:

1. A drive device for a vehicle flap, comprising:
    an electric motor for driving the vehicle flap;
    a supply circuit comprising a first voltage source for supplying power to the electric motor, a first electrical lead and a second electrical lead connecting the electric motor with the first voltage source, the first voltage source being arranged between the first electrical lead and the second electrical lead; and
    a control circuit connected to the supply circuit, wherein the control circuit comprises a second voltage source, a logic unit and a switch control device, wherein the logic unit is coupled to the switch control device and the second voltage source supplies current both to the logic unit and the switching control device,
    wherein a switching element and a diode are connected between the first electrical lead and the second electrical lead,
    wherein the switching element and the diode are connected in series, and
    wherein the switch control device is configured as a relay.
2. The drive device according to claim 1, wherein the switching element is coupled to the switch control device, and wherein the switch control device provides a control voltage for switching the switching element.

3. The drive device according to claim 1, wherein the diode is arranged in a forward direction, in a direction from the first electrical lead to the second electrical lead.

4. The drive device according to claim 1, wherein the diode is arranged in between the first electrical lead to the second electrical lead, such that the drive device is braked in a closing direction in the event of a short circuit.

5. The drive device according to claim 1, wherein the switching element that is coupled to the switch control device is configured as a normally closed contact.

6. The drive device according to claim 1, wherein the switching element that is coupled to the switch control device is configured as an operating contact.

7. The drive device according to claim 1, wherein the diode is configured as a flyback diode.

8. The drive device according to claim 1, wherein the electric motor is configured as a brushless DC motor.

9. The drive device according to claim 1, wherein the vehicle flap is configured as a vehicle door.

10. A drive device for a vehicle flap, comprising
an electric motor for driving the vehicle flap;
a supply circuit comprising a first voltage source for supplying power to the electric motor, a first electrical lead and a second electrical lead connecting the electric motor with the first voltage source, the first voltage source being arranged between the first electrical lead and the second electrical lead; and
a control circuit connected to the supply circuit, wherein the control circuit comprises a second voltage source, a logic unit and a switch control device, wherein the logic unit is coupled to the switch control device and the second voltage source supplies current both to the logic unit and the switching control device,
wherein a switching element and a diode are connected between the first electrical lead and the second electrical lead,
wherein the switching element and the diode are connected in series, and
wherein the switching element is configured as a bipolar transistor.

11. The drive device according to claim 10, wherein a base of the bipolar transistor is connected to the switch control device.

12. The drive device according to claim 11, wherein the switch control device provides a control voltage at the base and the bipolar transistor.

13. The drive device according to claim 10, wherein the bipolar transistor is configured as a NPN transistor.

14. A drive device for a vehicle flap, comprising
an electric motor for driving the vehicle flap;
a supply circuit comprising a first voltage source for supplying power to the electric motor, a first electrical lead and a second electrical lead connecting the electric motor with the first voltage source, the first voltage source being arranged between the first electrical lead and the second electrical lead; and
a control circuit connected to the supply circuit, wherein the control circuit comprises a second voltage source, a logic unit and a switch control device, wherein the logic unit is coupled to the switch control device and the second voltage source supplies current both to the logic unit and the switching control device,
wherein a switching element and a diode are connected between the first electrical lead and the second electrical lead,
wherein the switching element and the diode are connected in series, and
wherein the switching element is configured as a unipolar transistor.

15. The drive device according to claim 14, wherein a gate of the unipolar transistor is connected to the switch control device.

16. The drive device according to claim 14, wherein the switch control device provides a control voltage at a gate of the unipolar transistor.

\* \* \* \* \*